United States Patent
Hilburn, Jr.

(10) Patent No.: US 8,720,138 B2
(45) Date of Patent: *May 13, 2014

(54) FIRE BARRIER

(71) Applicant: Balco, Inc., Wichita, KS (US)

(72) Inventor: Johnnie Daniel Hilburn, Jr., Wichita, KS (US)

(73) Assignee: Balco, Inc., Wichita, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 14/088,071

(22) Filed: Nov. 22, 2013

(65) Prior Publication Data

US 2014/0075866 A1 Mar. 20, 2014

Related U.S. Application Data

(63) Continuation of application No. 11/625,174, filed on Jan. 19, 2007, now Pat. No. 8,601,760.

(51) Int. Cl.
*E04C 2/00* (2006.01)
*E04B 1/94* (2006.01)

(52) U.S. Cl.
CPC ............... *E04B 1/948* (2013.01); *Y10S 428/92* (2013.01)
USPC ...... 52/232; 52/396.01; 52/309.4; 52/396.04; 428/920

(58) Field of Classification Search
CPC ......... E04B 1/948; E04B 1/94; E04B 4/7411; E04B 1/942; E04B 1/6804; E04B 1/6815; Y10S 428/92
USPC ............... 52/393–402, 1, 232, 309.1–309.17; 428/316.6, 319.1, 319.3, 319.7
See application file for complete search history.

(56) References Cited

U.S. PATENT DOCUMENTS

| | | | | | |
|---|---|---|---|---|---|
| 3,934,066 | A | * | 1/1976 | Murch | 442/221 |
| 4,622,251 | A | * | 11/1986 | Gibb | 428/359 |
| 4,756,945 | A | * | 7/1988 | Gibb | 428/124 |
| 5,501,045 | A | * | 3/1996 | Wexler | 52/232 |
| 5,765,332 | A | * | 6/1998 | Landin et al. | 52/396.01 |
| 5,974,750 | A | * | 11/1999 | Landin et al. | 52/396.01 |
| 6,126,874 | A | * | 10/2000 | Dillon et al. | 264/29.7 |
| 6,182,407 | B1 | * | 2/2001 | Turpin et al. | 52/232 |
| 6,207,085 | B1 | * | 3/2001 | Ackerman | 252/606 |
| 6,207,089 | B1 | * | 3/2001 | Chuang | 264/135 |
| 6,996,944 | B2 | * | 2/2006 | Shaw | 52/232 |
| 8,601,760 | B2 | * | 12/2013 | Hilburn, Jr. | 52/232 |

* cited by examiner

*Primary Examiner* — Branon Painter
(74) *Attorney, Agent, or Firm* — Hovey Williams LLP (57) ABSTRACT

A fire barrier operable to be placed within a gap formed between two surfaces. The fire barrier may generally include a first intumescent section, a first foam section coupled with the first intumescent section, and a second intumescent section coupled with the first foam section generally opposite the first intumescent section. In some embodiments, the fire barrier may include a plurality of intumescent sections and a plurality of foam sections with each foam section being positioned between at least two of the intumescent sections.

17 Claims, 6 Drawing Sheets

FIRE BARRIER

RELATED APPLICATIONS

The present application is a continuation application and claims priority benefit, with regard to all common subject matter, of earlier-filed U.S. nonprovisional patent application titled "FIRE BARRIER", Ser. No. 11/625,174, filed Jan. 19, 2007. The identified earlier-filed application is hereby incorporated by reference into the present application in its entirety.

BACKGROUND

1. Field

Embodiments of the present invention relate to fire barriers. More particularly, various embodiments of the invention provide a fire barrier including a plurality of intumescent sections.

2. Description of the Related Art

It is often desirable to position fire-resistive materials such as intumescent sheets within joints formed between roof, wall, floor, and ceiling members. Unfortunately, prior art fire barriers often fail to properly orient intumescent sheets within joints and are susceptible to joint expansion and contraction.

SUMMARY

Embodiments of the present invention solve the above-described problems and provide a distinct advance in the art of fire barriers. More particularly, various embodiments of the invention provide a fire barrier including a plurality of intumescent sections which may be securely and properly positioned within a gap.

For example, various embodiments of the present invention provide a fire barrier that is operable to be placed within a gap formed between two surfaces. The fire barrier may generally include a first intumescent section, a first foam section coupled with the first intumescent section, and a second intumescent section coupled with the first foam section generally opposite the first intumescent section. In some embodiments, the fire barrier may include a plurality of intumescent sections and a plurality of foam sections with at least some of the foam sections being positioned between at least two of the intumescent sections.

Other aspects and advantages of the present invention will be apparent from the following detailed description and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention,

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Referring to FIGS. 1-6, embodiments of the present invention provide a fire barrier 10 operable to be positioned within a gap A formed between two surfaces B, C. The barrier 10 may be installed within gaps between surfaces including roof, wall, floor, ceiling members, combinations thereof, or any other gaps, joints, or spaces formed between building and construction elements. Each surface B, C may include a plurality of sides, such as top, right, left, and bottom sides.

Figure 1:
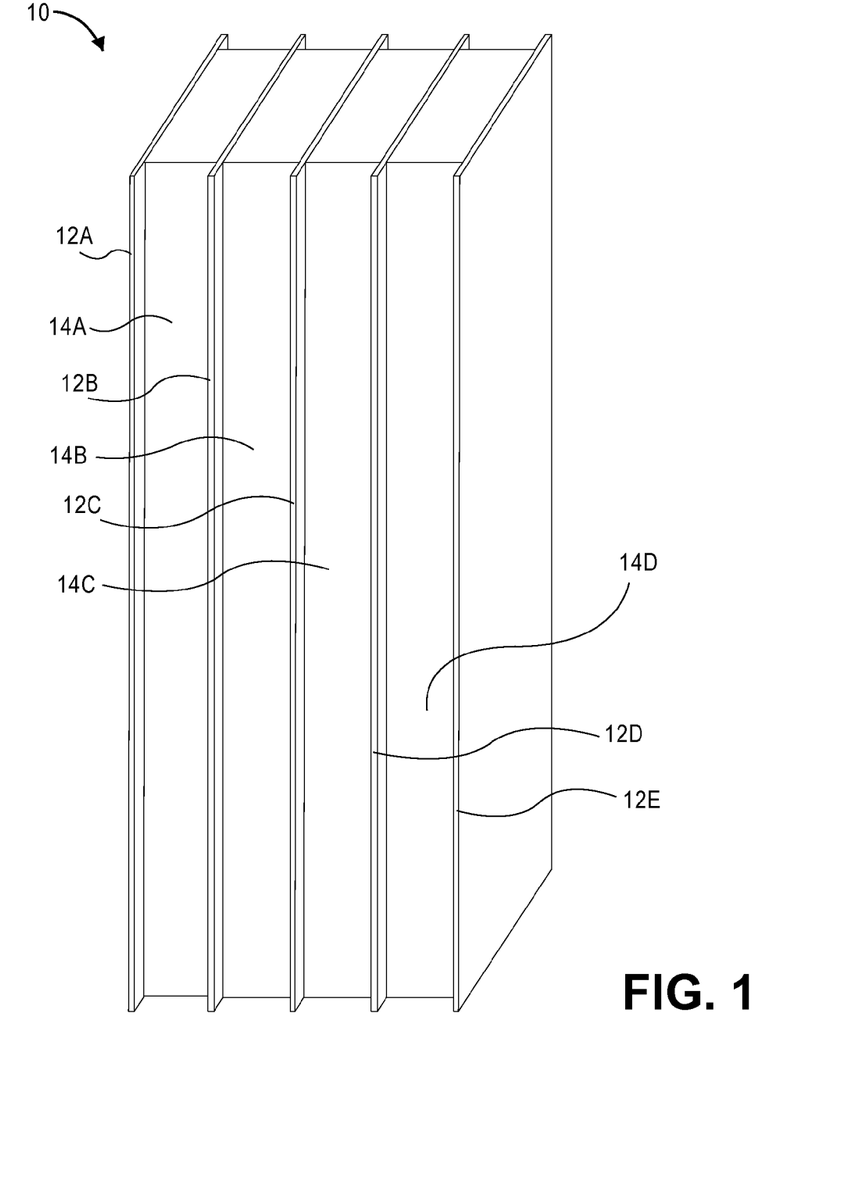
FIG. 1 is a perspective view of a fire barrier constructed in accordance with various embodiments of the present invention.
Figure 3:
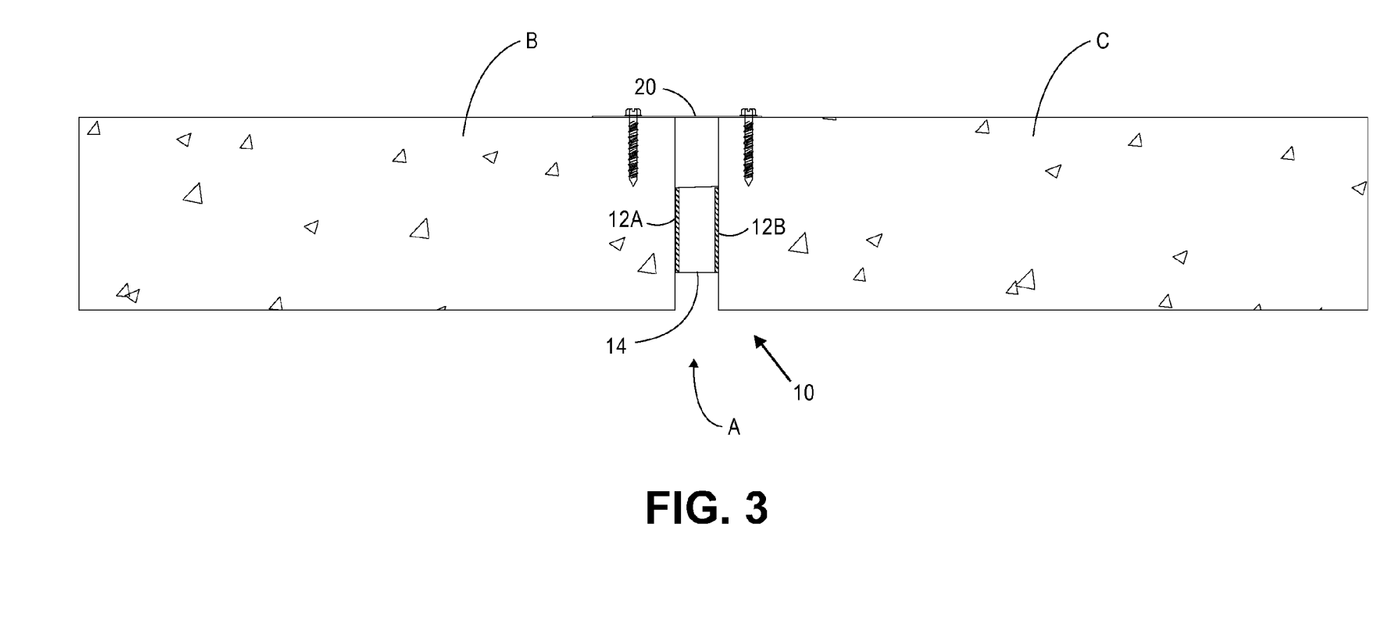
FIG. 3 is a side view of another fire barrier constructed in accordance with various embodiments of the present invention, the fire barrier shown installed within a gap formed between two surfaces.

The barrier 10 broadly includes at least one intumescent section 12 and at least one foam section 14. In some embodiments, the barrier 10 includes a plurality of intumescent sections 12 and a plurality of foam sections 14. In other embodiments, the barrier 10 includes two intumescent sections 12a, 12b positioned on opposite sides of one foam section 14, as is shown in FIG. 3, which may be configured for utilization with one-inch gaps. In some other embodiments, the barrier 10 includes five intumescent sections 12a, 12b, 12c, 12d, 12e positioned on opposite sides of four foam sections 14a, 14b, 14c, 14d, as is shown in FIG. 1, which may be configured for utilization with four-inch gaps. However, the barrier 10 may employ any number of foam and intumescent sections positioned in any configuration for installation in any sized gaps and is not limited to the specific configurations discussed herein.

Each intumescent section 12 may include any intumescent material operable to expand and/or swell when exposed to heat. In various embodiments, each intumescent section 12 includes an intumescent material extruded onto a film such as wax paper, mineral wool, artificial fiber ribbons, polyethylene film, polypropylene film, polyurethane film, polyester film, combinations thereof, and the like. In some embodiments, each intumescent section 12 may be comprised of a $C_2$-$C_8$ alkyl diamine phosphate fire retardant, as disclosed in U.S. Pat. No. 6,207,085, which is incorporated herein by specific reference.

Each intumescent section 12 preferably presents a generally rectangular configuration to generally form a cuboid. Thus, "rectangular" as utilized herein refers to both two-dimensional and three-dimensional rectangles. However, the intumescent sections 12 may present any form or configuration and are not limited to rectangular configurations. Thus, in some embodiments some of the intumescent sections 12 may present a first geometric configuration while some of the other intumescent sections 12 may present a second geometric configuration. Consequently, each of the intumescent sections 12 may present a unique geometric or structural configuration.

The volume provided by each of the intumescent sections 12 may be selected to correspond to the dimensions of the gap A. In some embodiments, it may be desirable to position only one intumescent section 12 within the gap A while in other embodiments it may be desirable to position a plurality of intumescent sections 12 within the gap A. The intumescent sections 12 may present any volume or dimensions to desirably fill at least a portion of the gap A.

The foam sections 14 are generally operable to couple with one or more of the intumescent sections 12 to preferably form the sandwich-like configuration shown in FIGS. 1 and 3. Each foam section 14 is preferably formed of a flexible foam material to enable the intumescent sections 12 and foam sections 14 to be compressed within the gap A, as is discussed in more detail below. In some embodiments, one or more of the foam sections 14 may be comprised of flexible polyurethane foam.

Each foam section 14 preferably presents a generally rectangular configuration such that each foam section 14 generally forms a cuboid in a similar manner to the intumescent sections 12 discussed above. However, the foam sections 14 may present any form or configuration and are not limited to rectangular configurations. Thus, in some embodiments some of the foam sections 14 may present a first geometric configuration while some of the other foam sections 14 may present a second geometric configuration. Consequently, each of the foam sections 14 may present a unique geometric or structural configuration.

In some embodiments, as shown in FIG. 1, the foam sections 14 may present a length and a width that is generally similar to the length and width of the intumescent sections 12 such that the foam sections 14 dimensionally vary from the dimensions of the intumescent sections 12 only in thickness. Preferably, the foam sections 14 are substantially thicker than the intumescent sections 12. Such a configuration provides proper spacing between the intumescent sections 12 to facilitate proper positioning within the gap A and fire barrier functionality. However, the foam sections 14 may vary from the configuration of the intumescent sections 12 such that any foam section 14 may be larger or smaller in any dimension than any intumescent section 12. Further, any foam section 14 may present the same dimensions as any of the intumescent sections 12.

Each of the intumescent sections 12 preferably abuts at least one of the foam sections 14. In some embodiments, each of the foam sections 14 preferably abuts at least two of the intumescent sections 12. Further, in some embodiments, various sections 12, 14 may abut each other substantially along their lengths. For example, as shown in FIG. 1, each foam section 14 may abut at least two of the intumescent sections 12 substantially along its length. Thus, the fire barrier 10 may present a substantially rectangular configuration where the intumescent sections 12 and foam sections 14 are each configured as cuboids having similar lengths and widths. However, the fire barrier 10 may present any geometric or structural configuration by including intumescent sections 12 and foam sections 14 having any dimensions.

The intumescent sections 12 and the foam sections 14 may be coupled or otherwise joined together utilizing fastening elements such as nails, screws, staples, bolts, pins, combinations thereof, and the like. In some embodiments, the intumescent sections 12 and foam sections 14 may be bonded together utilizing an adhesive such as tape. In other embodiments, the sections 12, 14 may additionally or alternatively be bonded together through heat bonding. For instance, various sections 12, 14 may be laminated together utilizing heat and the intumescent sections 12 may be extruded onto the laminated foam sections 14.

Figure 2:
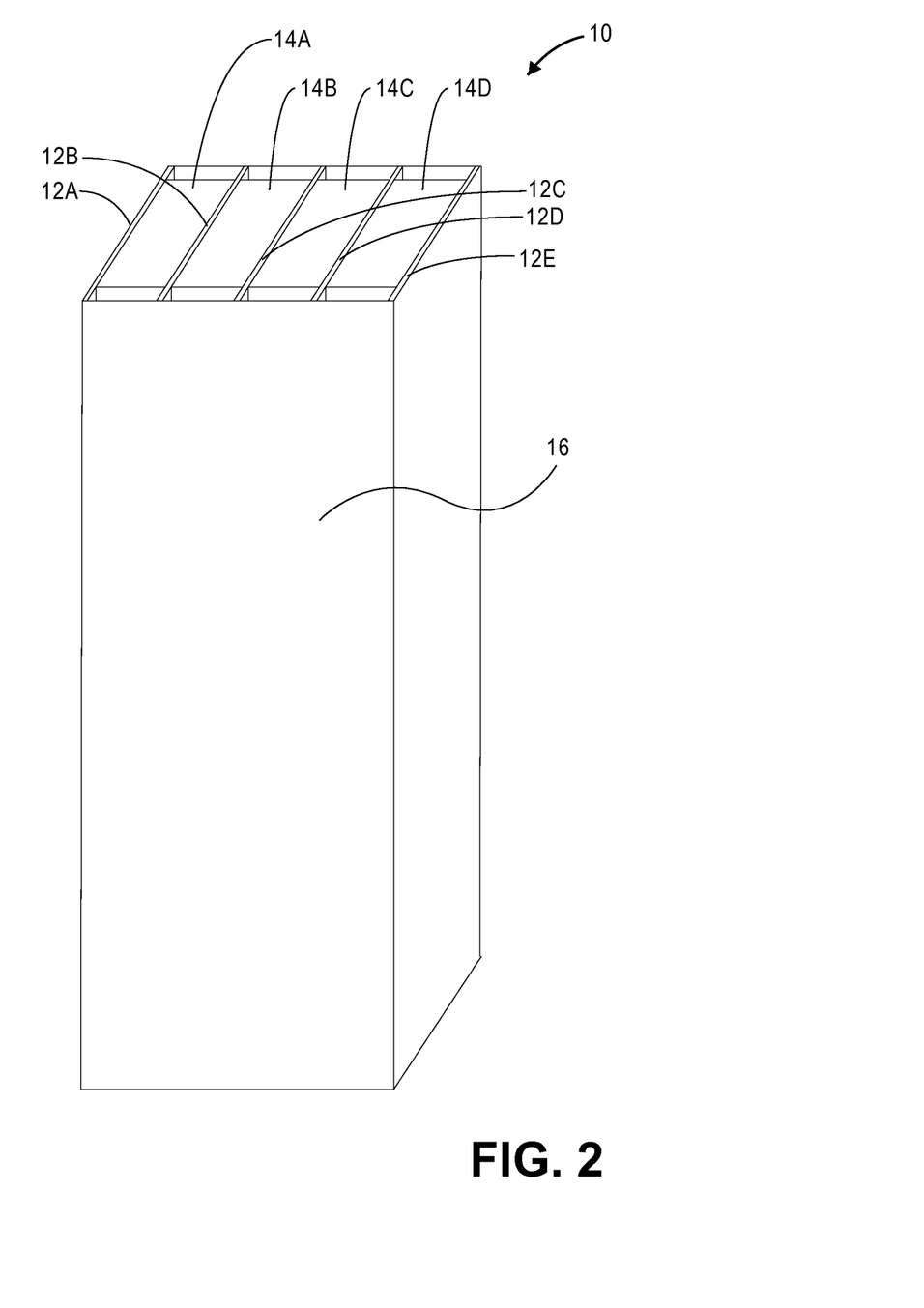
FIG. 2 is a perspective view of the fire barrier of FIG. 1 showing the fire barrier encapsulated by a high-temperature material.

In some embodiments, as shown in FIG. 2, the barrier 10 may include a high-temperature material 16 to at least partially encapsulate the intumescent sections 12 and the foam sections 14. The high-temperature material 16 may be any generally heat or fire resistant material, including but not limited to metallic foils, fiberglass scrims, high-temperature textiles, and combinations thereof. The intumescent sections 12 and foam sections 14 may be fully enveloped by the high-temperature material 16 or the high-temperature material 16 may be positioned on or over only a portion of the intumescent sections 12 and foam sections 14.

Preferably, the high-temperature material 16 surrounds the exposed sides of the intumescent sections 12 and foam sections 14 while leaving the tops and bottoms of the sections 12, 14 uncovered, as shown in FIG. 2. Such a configuration allows the barrier 10 to generally retain its shape when compressed and facilitates proper positioning of the barrier 10. In some embodiments, the high-temperature material 16 may be adhered to the various sections 12, 14.

Figure 4:
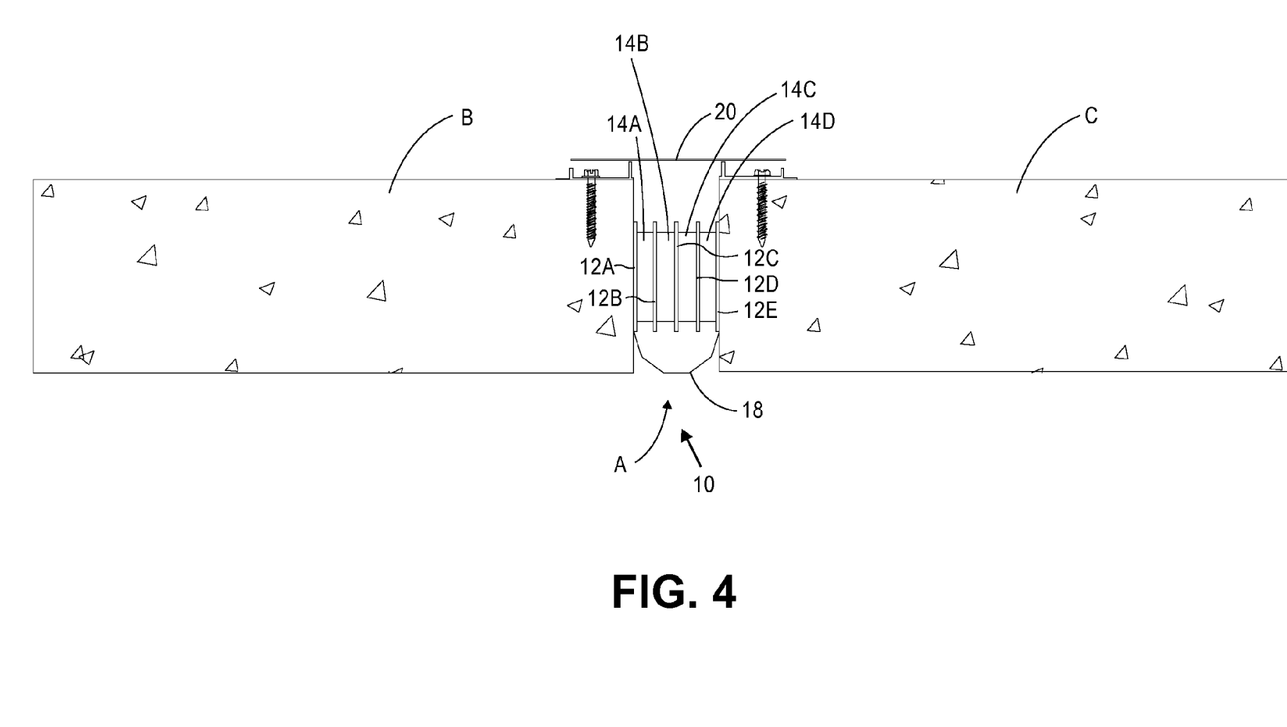
FIG. 4 is a side view of the fire barrier of FIG. 1 shown installed within a gap formed between two surfaces.
Figure 5:
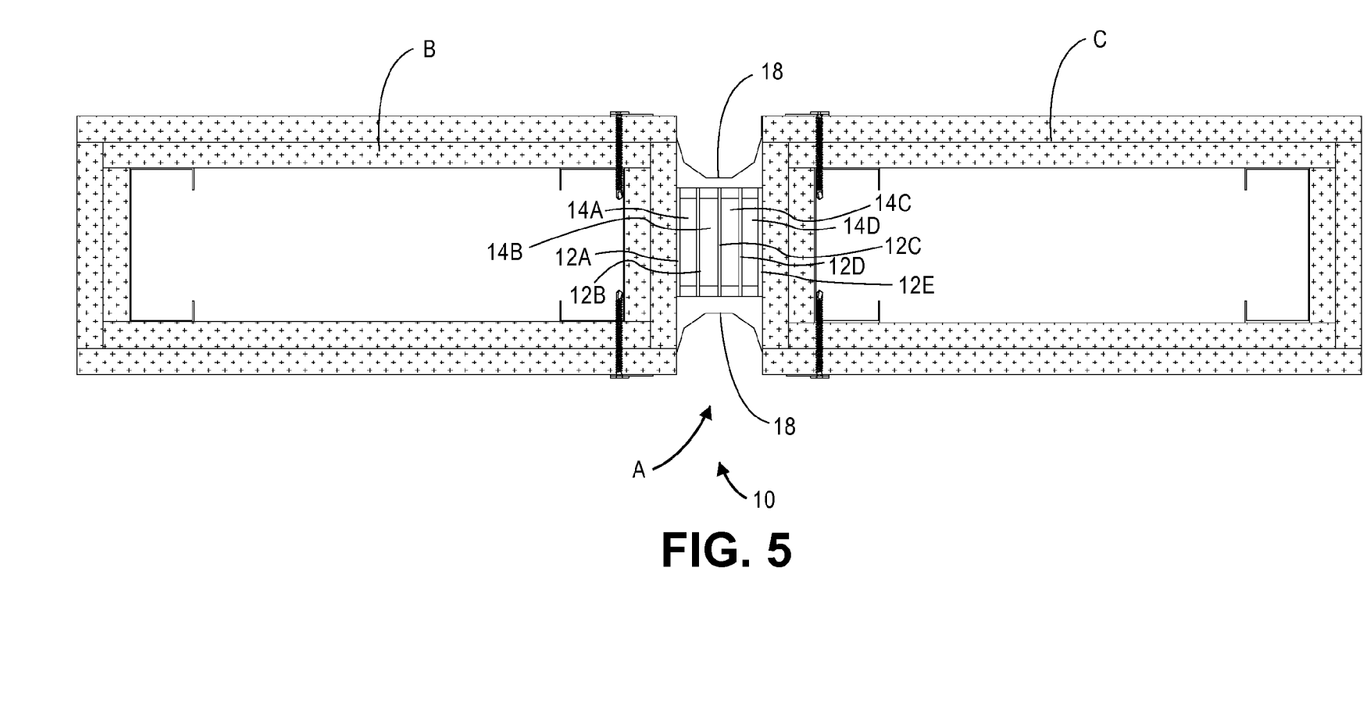
FIG. 5 is a cross-sectional view of the fire barrier of FIG. 1 shown installed within a gap formed between two surfaces.

In various embodiments, as shown in FIGS. 4-5, the barrier 10 may additionally include or otherwise utilize one or more support sections 18. Each support section 18 may be comprised of any generally heat or fire resistant material, including but not limited to metallic foils, fiberglass scrims, high-temperature textiles, and combinations thereof.

The support sections 18 are generally operable to be placed within the gap A to support the intumescent sections 12 and the foam sections 14. For example, one or more support sections 18 may be installed and/or positioned within the gap A and the intumescent sections 12 and foam sections 14 may rest upon the support sections 18 and/or be compressed into the support sections 18 to ensure proper placement of the barrier 10 within the gap A. Additionally or alternatively, the support sections 18 may be coupled with the intumescent sections 12 and/or foam sections 14 utilizing adhesives and/or mechanical fasteners.

In some embodiments, as shown in FIG. 5, the barrier 10 may include two support sections 18 positioned in proximity to each end of the intumescent sections 12 and foam sections 14. Utilization of more than one support section 18 facilitates proper placement of the fire barrier 10 within the gap A even if the gap A expands or contracts.

In operation, the barrier 10 may be positioned within the gap A utilizing any methods. Preferably, the barrier 10 is positioned in the gap A such that the seams or spaces formed between the various intumescent sections 12 and foam sections 14 run generally perpendicular to the gap A opening, and thus generally parallel to the gap's walls, as is shown in FIGS. 3-6. Thus, in some embodiments, no single intumescent section 12 or foam section 14 spans the entire width of the gap A. However, the fire barrier 10 may be positioned within the gap A in any orientation.

In some embodiments, the width of the barrier 10 may be larger than the width of the gap A such that the barrier 10 may be compressed for placement within the gap A. The compression of the barrier 10, and in particular the compression of the intumescent sections 12 and foam sections 14, enables the barrier 10 to be secured within the gap A by exerting a force against the sides of the gap A. Additionally or alternatively, the barrier 10 may be secured within the gap A by utilizing adhesives or mechanical fasteners, such as nails, screws, pins, bolts, combinations thereof, and the like, to attach or otherwise couple the barrier 10 to the sides of the gap A.

In embodiments where the barrier 10 includes the high-temperature material 16 to envelop at least a portion of the sections 12, 14, the barrier 10 may be positioned within the gap A through compression in a similar manner to that discussed above. Additionally or alternatively, the high-temperature material 16 may be affixed or otherwise coupled with the gap A by utilizing adhesives or mechanical fasteners, such as those discussed above.

The compression of the intumescent sections 12 and foam sections 14 within the gap A and/or the fastening of the sections 12, 14 within the gap A facilitates proper placement of the barrier 10 by enabling the barrier to retain its position within the gap A even if the gap A shifts, expands, contracts, or otherwise changes form due to environmental or structural factors.

In embodiments where the barrier 10 includes one or more of the support sections 18, the support sections 18 may be positioned within the gap A before the installation of the various intumescent sections 12 and foam sections 14. The intumescent sections 12 and foam sections 14 may then be compressed into the one or more support sections 18 to retain the various sections 12, 14, 18 within the gap A. Additionally, the support sections 18 may be compressed into the various intumescent sections 12 and foam sections 14 before or after the various sections 12, 14 are positioned within the gap A. As discussed above, the intumescent sections 12 and foam sections 14 may additionally or alternatively be coupled with the support sections 18 utilizing adhesives and/or fasteners.

The support sections 18 may additionally or alternatively be positioned within the gap A utilizing adhesives and/or fasteners. For example, one support section 18 may be coupled with the gap walls utilizing adhesives and/or fasteners, such as the various fasteners discussed above, and then the intumescent sections 12 and foam sections 14 may be positioned on and/or compressed into the installed support section 18. Additional support sections 18 may then be installed to further support the intumescent sections 12 and foam sections 14, as is shown in FIG. 5.

Figure 6:
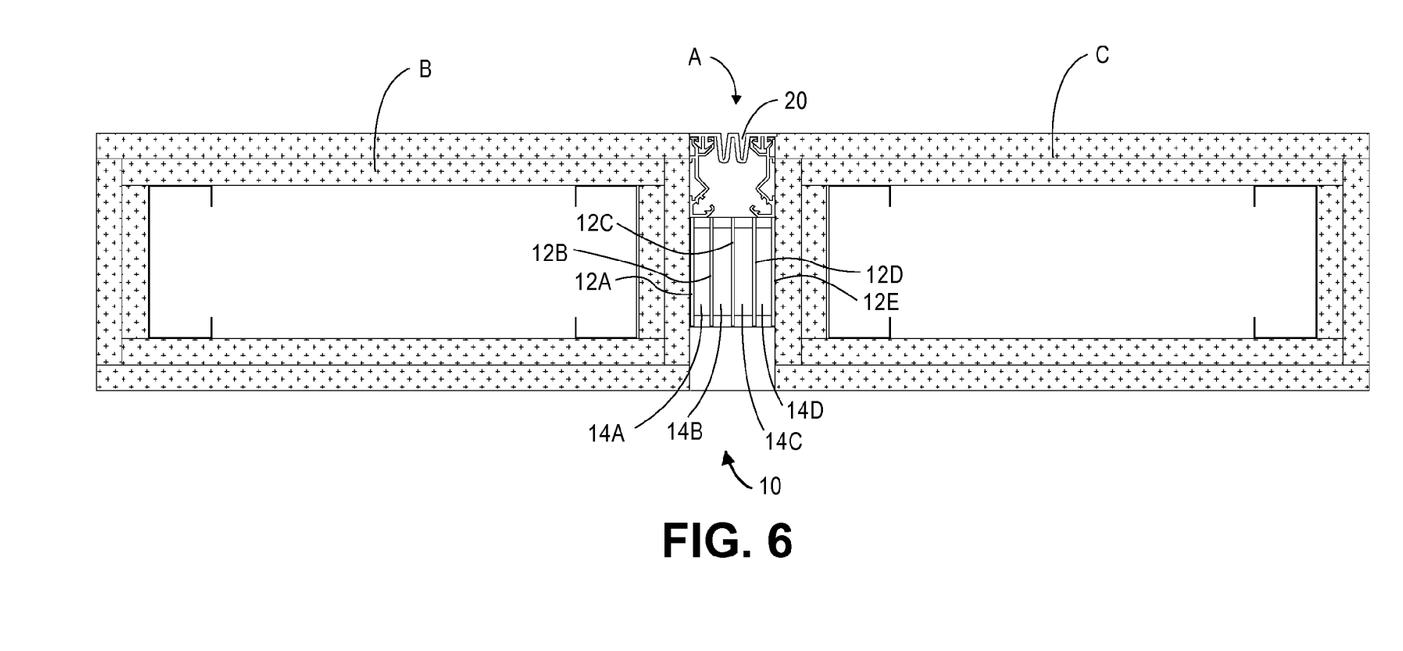
FIG. 6 is another cross-sectional view of the fire barrier of FIG. 1 shown installed within a gap formed between two surfaces.

In some embodiments, a joint cover 20 may be installed in combination with the barrier 10 to cover the gap A. The joint cover 20 may comprise a metallic floating or non-floating cover, as is shown in FIGS. 3-4. In other embodiments, the joint cover 20 may comprise a flexible elastomer seal, as shown in FIG. 6, a stainless steel foil cover, a compression seal system that employs elastomeric concretes or adhesives, and/or any conventional joint cover or joint seal system. Thus, the utilization of the barrier 10 does not restrict or otherwise prohibit the use of conventional and non-conventional joint covers.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A building joint fire barrier operable to be compressed within a gap between a first load bearing budding element and a second load bearing budding element, said fire barrier comprising:
   a first intumescent section with a surface positioned adjacent to the first load bearing building element;
   a second intumescent section with a surface positioned adjacent to the second load bearing building element;
   at least one foam section being compressible and flammable and having edges, wherein the foam section is positioned between the first and second intumescent sections such that the edges of the foam section are not covered by either of the intumescent sections;
   an encapsulant covering at least a portion of the first and second intumescent sections and the foam section; and
   one or more support sections positioned within the gap,
   wherein the building joint fire barrier is positioned within the gap such that no single intumescent section or foam section spans the entire width of the gap between the two building elements and the foam section edges are neither covered by intumescent sections nor in contact with the building elements and the building joint fire barrier is enabled to retain its position within the gap even if the gap shifts, expands, contracts, or otherwise changes form due to environmental or structural factors.

2. The fire barrier of claim 1, wherein the at least one foam sections and the intumescent sections present generally the same length and at least one of the foam sections abuts two of the intumescent sections substantially along its length.

3. The fire barrier of claim 1, wherein at least one of the at least one foam sections is adhered to two of the intumescent sections.

4. The fire barrier of claim 1, wherein at least one of the at least one foam sections and two of the intumescent sections are generally rectangular.

5. The fire barrier of claim 1, wherein the at least one foam sections are comprised of flexible polyurethane foam.

6. The fire barrier of claim 1, wherein the encapsulant is selected from the group consisting of a metallic foil, a fiberglass scrim, a high-temperature textile, and combinations thereof.

7. A building joint fire barrier operable to be compressed within a gap between a first bad bearing building element and a second bad bearing building element, said fire barrier comprising:
   a first intumescent section with a surface positioned adjacent to the first bad bearing building element;
   a second intumescent section with a surface positioned adjacent to the second load bearing building element;
   at least one foam section being compressible and flammable and having edges, wherein the foam section is positioned between the first and second intumescent sections such that the edges of the foam section are not covered by either of the intumescent sections; and
   an encapsulant covering at least a portion of the first and second intumescent sections and the foam section;
   wherein the building joint fire barrier is positioned within the gap such that no single intumescent section or foam section spans the entire width of the gap between the two building elements and the foam section edges are neither covered by intumescent sections nor in contact with the building elements and the building joint fire barrier is enabled to retain its position within the gap even if the gap shifts, expands, contracts, or otherwise changes form due to environmental or structural factors.

8. The fire barrier of claim 7, wherein the at least one foam sections and the intumescent sections present generally the same length and at least one of the foam sections abuts two of the intumescent sections substantially along its length.

9. The fire barrier of claim 7, wherein at least one of the at least one foam sections is adhered to two of the intumescent sections.

10. The fire barrier of claim 7, wherein at least one of the at least one foam sections and two of the intumescent sections are generally rectangular.

11. The fire barrier of claim 7, wherein the at least one foam sections are comprised of flexible polyurethane foam.

12. The fire barrier of claim 7, wherein the encapsulant is selected from the group consisting of a metallic foil, a fiberglass scrim, a high-temperature textile, and combinations thereof.

13. A budding joint fire barrier operable to be compressed within a gap between a first bad bearing building element and a second bad bearing building element, said fire barrier comprising:
   a first intumescent section with a surface positioned adjacent to the first bad bearing building element;
   a second intumescent section with a surface positioned adjacent to the second load bearing building element;
   at least one foam section being compressible and flammable and having edges, wherein the foam section is positioned between the first and second intumescent sections such that the edges of the foam section are not covered by either of the intumescent sections; and
   one or more support sections positioned within the gap, wherein the building joint fire barrier is positioned within the gap such that no single intumescent section or foam section spans the entire width of the gap between the two building elements and the foam section edges are neither covered by intumescent sections nor in contact with the building elements and the building joint fire barrier is enabled to retain its position within the gap even if the gap shifts, expands, contracts, or otherwise changes form due to environmental or structural factors.

14. The fire barrier of claim 13, wherein the at least one foam sections and the intumescent sections present generally the same length and at least one of the foam sections abuts two of the intumescent sections substantially along its length.

15. The fire barrier of claim 13, wherein at least one of the at least one foam sections is adhered to two of the intumescent sections.

16. The fire barrier of claim 13, wherein at least one of the at least one foam sections and two of the intumescent sections are generally rectangular.

17. The fire barrier of claim 13, wherein the at least one foam sections are comprised of flexible polyurethane foam.

* * * * *